United States Patent [19]
Sowell et al.

[11] Patent Number: 6,011,857
[45] Date of Patent: Jan. 4, 2000

[54] DETECTING COPY RESTRICTIVE DOCUMENTS

[75] Inventors: Quinton L. Sowell; Joseph P. DiVincenzo; Jay S. Schildkraut, all of Rochester, N.Y.

[73] Assignee: Eastman Kodak Company, Rochester, N.Y.

[21] Appl. No.: 08/908,682

[22] Filed: Aug. 7, 1997

[51] Int. Cl.[7] .................................................. G06K 9/00
[52] U.S. Cl. ........................................... 382/100; 382/317
[58] Field of Search ............................ 399/366; 283/93, 283/902; 382/100, 135, 289, 291, 317, 318, 319

[56] References Cited

U.S. PATENT DOCUMENTS

| | | | |
|---|---|---|---|
| 4,516,265 | 5/1985 | Kizu et al. ................................. | 382/48 |
| 4,802,229 | 1/1989 | Yamada ..................................... | 382/1 |
| 5,018,767 | 5/1991 | Wicker ...................................... | 283/67 |
| 5,193,853 | 3/1993 | Wicker ...................................... | 283/85 |
| 5,231,663 | 7/1993 | Earl et al. ................................. | 380/18 |
| 5,379,093 | 1/1995 | Hashimoto et al. ....................... | 355/201 |
| 5,390,003 | 2/1995 | Yamaguchi et al. ...................... | 355/201 |
| 5,412,718 | 5/1995 | Narasimhalu et al. .................... | 380/4 |
| 5,444,779 | 8/1995 | Daniele ..................................... | 380/3 |
| 5,467,169 | 11/1995 | Morikawa ................................. | 355/201 |
| 5,647,010 | 7/1997 | Okubo et al. ............................. | 382/100 |
| 5,719,968 | 2/1998 | Hashimoto et al. ...................... | 382/288 |
| 5,752,152 | 5/1998 | Gasper et al. ............................ | 399/366 |
| 5,772,250 | 6/1998 | Gasper ...................................... | 283/114 |
| 5,822,660 | 10/1998 | Wen ......................................... | 399/194 |
| 5,841,905 | 11/1998 | Lee .......................................... | 382/203 |
| 5,843,564 | 12/1998 | Gasper et al. ............................ | 428/211 |
| 5,845,008 | 12/1998 | Katoh et al. ............................. | 382/217 |

*Primary Examiner*—Andrew W. Johns
*Attorney, Agent, or Firm*—Nelson Adrian Blish; David A. Novais

[57] ABSTRACT

A method for detecting copy restrictive documents is disclosed. At least one photograph (101) is placed on a scanner platen (10) and a low resolution scan is performed (20) to produce a low resolution image. A skew angle and a location of the photograph is determined (30). The photograph is rescanned at a high resolution (40) to produce a high resolution image, the high resolution image is deskewed (45), and the high resolution image is checked (50) for the presence of one or more microdots. Use of the high resolution image is inhibited if microdots are detected (55). In one embodiment, a plurality of photographs are placed on the scanner platen and a portion of each the high resolution images is checked by a software program for the presence of microdots.

3 Claims, 13 Drawing Sheets

DETECTING COPY RESTRICTIVE DOCUMENTS

CROSS REFERENCE TO RELATED APPLICATIONS

The present application is related to U.S. application Ser. No. 08/739,076, filed Oct. 28, 1996, titled "A Look-Up-Table Technique for Conversion of a Bitmap Image Into Polygon Representation," by Yongchun Lee; U.S. Pat. application Ser. No. 08/738,206, filed Oct. 25, 1996, now U.S. Pat. No. 5,841,905, titled "Business Form Image Identification Using Projected Profiles of Graphical Line and Text String Lines," by Yongchun Lee; U.S. application Ser. No. 08/831,272, filed Mar. 31, 1997, titled "A Method for Scanning and Detecting Multiple Photographs and Removing Edge Artifacts," by Yongchun Lee and Quinton Sowell; U.S. application Ser. No. 08/593,772, filed Jan. 29, 1996, titled, "Copy Protection System," by Jay S. Schildkraut, et al.; U.S. application Ser. No. 08/598,785, filed Feb. 8, 1996, now U.S. Pat. No. 5,919,730, titled, "Copy Restrictive Documents," by John Gasper, et al.; U.S. application Ser. No. 08/598,446, filed Feb. 8, 1996, now U.S. Pat. No. 5,822,660, titled, "Copyright Protection in Color Thermal Prints," by Xin Wen; (The last two applications were filed on even date with the present application.); U.S. application Ser. No. 08/598,778, filed Feb. 8, 1996, now U.S. Pat. No. 5,752,152, titled, "Copy Restrictive System," by John Gasper, et al.

FIELD OF THE INVENTION

The invention relates generally to the field of copy restrictive documents, and in particular to an apparatus for detecting copy restrictive documents and restricting copying of material protected by copyright.

BACKGROUND OF THE INVENTION

Copying of documents has been performed since the first recording of information in document form. Documents are produced using many procedures on many types of substrates and incorporate many forms of information. Unauthorized copying of documents has also been occurring since the storage of information in document form first began. For much of the history of information documentation, the procedures used to copy original documents have been sufficiently cumbersome and costly to provide a significant impediment to unauthorized copying, thus limiting unauthorized copying to original documents of high value. However, in more recent times the introduction of new technologies for generating reproductions of original documents, has decreased the cost and inconvenience of copying documents, thus increasing the need for an effective method of inhibiting unauthorized copying of a broader range of restricted documents.

The inability of convenient, low-cost copying technologies to copy original documents containing color or continuous tone pictorial information, restricted unauthorized copying primarily to black-and-white documents containing textual information and line art. Recently, the introduction of cost effective document scanning and digital methods of signal processing and document reproduction have extended the ability to produce low cost copies of original documents to documents containing color and high quality pictorial information. It is now possible to produce copies of any type of document quickly, conveniently, and cost effectively which are indistinguishable from the original. Accordingly, the problem of unauthorized copying of original documents has been extended from simple black-and-white text to color documents, documents containing pictorial images, and photographic images. In particular, restricting the unauthorized duplication of photographic images produced by professional photographers on digital copying devices has recently become of great interest.

U.S. Pat. Nos. 5,193,853 and 5,018,767 by Wicker, disclose methods for restricting the unauthorized copying of original documents on devices utilizing opto-electronic scanning by incorporating spatially regular lines into the original document. The spacing of the lineations incorporated in the original document are carefully selected to produce Moiré patterns of low spatial frequency in the reproduced document allowing it to be easily distinguished from the original and degrading the usefulness of the reproduction. Although the Moiré patterns produced in the reproduced document are readily apparent to an observer, the required line pattern incorporated in the original document to produce the Moiré pattern upon copying is also apparent to an observer under normal conditions of use. Additionally, production of the Moiré pattern in the reproduced document requires that specific scanning pitches be employed by the copying device. Accordingly, this method of restricting unauthorized document copying is applicable only to documents such as currency or identification cards where the required line pattern can be incorporated without decreasing the usefulness of the document. Application of this technique to high quality documents is unacceptable due to the degradation of quality of the original document.

U.S. Pat. No. 5,444,779 by Daniele, discloses a method of preventing unauthorized copying by the printing of a two-dimensional encoded symbol in the original document. Upon scanning of the original document in an initial step of a copying process, the encoded symbol is detected in the digital representation of the original document and the copying process is either inhibited or allowed following billing of associated royalty fees. U.S. patent application Ser. No. 08/593,772, filed Sep. 28, 1995, by Schildkraut et al., and titled "Copy Protection System," discloses the incorporation of a symbol of a defined shape and color into a document followed by detection of the symbol in a scanned representation of the document produced by the copying device. In both disclosures, the incorporated symbol is detectable by an observer under normal conditions of use and readily defeated by cropping the symbol from the original document prior to copying. In addition, incorporation of the symbol into the document is required in the generation of the original document leading to undesired inconvenience and additional cost. Accordingly, these methods of imparting restriction from unauthorized copying are unacceptable.

U.S. Pat. No. 5,390,003 by Yamaguchi, et al.; U.S. Pat. No. 5,379,093 by Hashimoto, et al.; and U.S. Pat. No. 5,231,663 by Earl, et al.; disclose methods of recognizing a copy restricted document by the scanning and analysis of some portion of the original document and comparison of the signal obtained with the signals stored in the copying device. When the signal of a copy restricted document is recognized, the copying process is inhibited. This method of restricting unauthorized copying of documents is limited because the signals of all documents to be copy restricted must be stored in or accessible by each copying device of interest. Because the number of potential documents to be copy restricted is extremely large and always increasing, it is impractical to maintain an updated signal database in the copying devices of interest.

Methods of encrypting a digital signal into a document produced by digital means have been disclosed. These methods introduce a signal which can be detected in a copying system utilizing document scanning and signal processing. These methods offer the advantage of not being detectable by an observer under normal conditions of use, thus maintaining the usefulness of high quality copy restricted documents. However, implementation of these methods is dependent on digital production of original documents. Although increasing, production of high quality documents using digital means is still limited. Accordingly, this approach is not useful for restricting the unauthorized copying of high quality documents produced using non-digital production methods.

U.S. Pat. No. 5,412,718 by Narasimhalu, et al. discloses the use of a key associated with the physical properties of the document substrate which is required to decode the encrypted document. This method of restricting the unauthorized copying of documents is unacceptable for applications of interest to the present invention because it requires encryption of the original document rendering it useless prior to decoding.

U.S. application Ser. No. 08/598,778, filed Feb. 08, 1996, now U.S. Pat. No. 5,752,152, by John Gasper, et al., and titled, "Copy Restrictive System", and U.S. patent application Ser. No. 08/598,785, filed on Feb. 08, 1996, now U.S. Pat. No. 5,919,730, by John Gasper, et al., and titled, "Copy Restrictive Documents" disclose pre-exposing color photographic paper to spots of blue light to produce an array of yellow microdots after chemical processing and a method of detecting these microdots during scanning performed by a digital printing device. Color photographic paper capable of forming yellow microdots after exposure to spots of blue light is of the color-negative type.

Finally, U.S. patent application Ser. No. 08/837,931, filed Apr. 11, 1997, now U.S. Pat. No. 5,864,742, titled, "Copy Restrictive System For Color-Reversal Documents" by John Gasper, et al.; and U.S. patent application Ser. No. 08/835,976, filed on Apr. 11, 1997, now U.S. Pat. No. 5,772,250, titled "Copy Restrictive Color-Reversal Documents," by John Gasper, disclose pre-exposing color-reversal photographic paper to spots of blue light to produce an array of minus-yellow microdots after chemical processing and a method of detecting these microdots during scanning performed by a digital printing device. These methods prevent copying restricted documents, but are not foolproof because of operational conditions in the field.

Two components necessary to prevent a user from copying a copy restricted document are a scanner recognizable pattern of microdots on the paper or photograph which are invisible to the human eye, and a software algorithm which locates the pattern in a digital image. The software is preprogrammed to use a specific portion of the scanned region as an input. After processing, the algorithm will determine whether the image is protected or not. The copy-protection software is incorporated in applications which have a scan-print or a scan-store capability. A typical flow path of such a system is as follows:

a user places a photograph on a scanner platen;

the user selects output print size desired;

the system performs a low resolution scan;

the system displays a digital image of the photograph;

the user selects the print button;

a software algorithm determines whether the image is copy restricted;

if the image is not copy restricted, the system makes the print; or if the image is copy restricted, the user is prevented from making the print.

One problem with the prior art is that the software algorithm interprets the input image as a single photograph. If the user places multiple photographs on the scanner platen, some of which may be copy restrictive and some which are not copy restrictive, current systems cannot distinguish which photographs are copy restrictive and which are not, since the system only determines whether the entire input area is protected or not by sampling a portion of the input area. The reason for this is that it would be overly time consuming running the entire scanned image through the software algorithm to determine whether the entire image incorporates a microdot pattern indicating the photograph is copy restricted. Therefore, the system samples a portion of the scanned image, which may or may not be copy restrictive.

Figure 1:
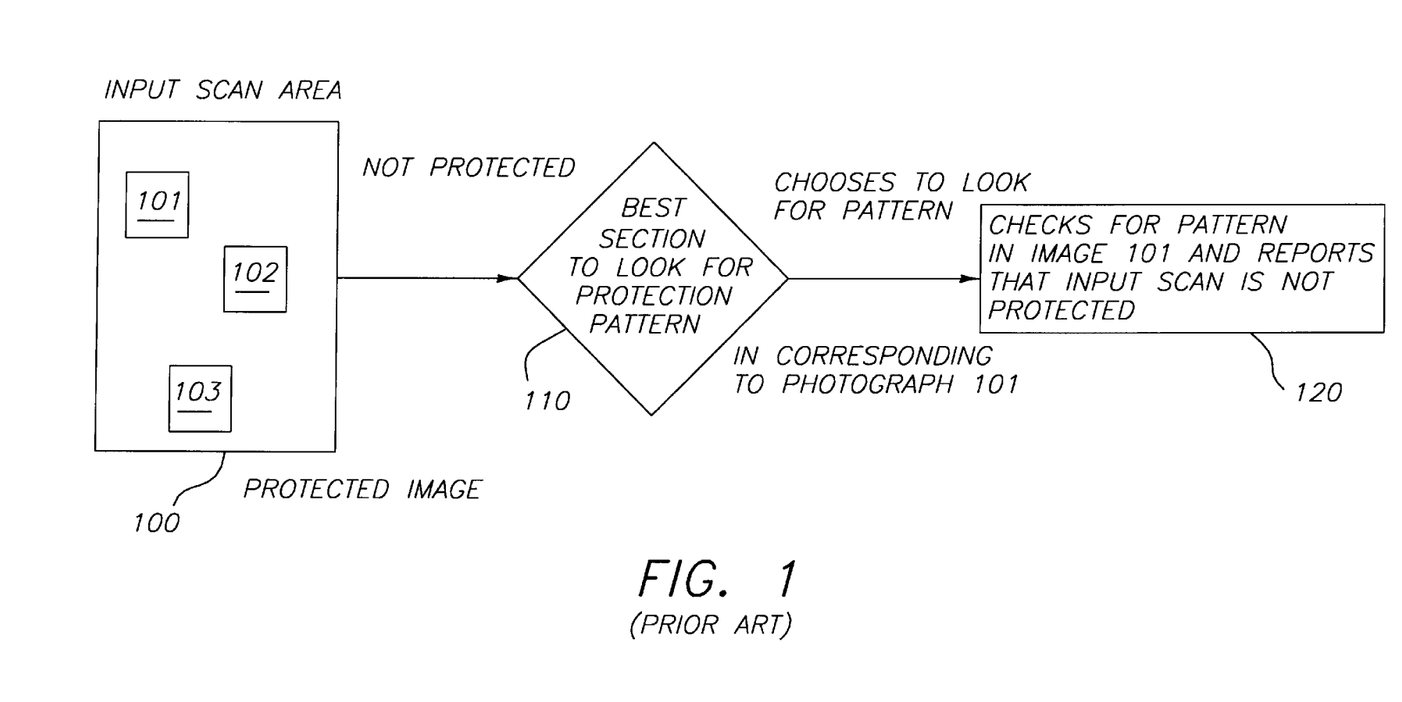
FIG. 1 is a flow diagram representing a prior art method for detecting copy restrictive documents.

FIG. 1 shows a typical situation. A user placed several photographs 101–103 on a scanner at block 100. In this example, photographs 101 and 102 are not copy restricted and photograph 103 is copy restricted. The entire platen is then scanned. The software selects a section of the scanned image to check for the microdot pattern at block 110. In this scenario, the system looks for the protection pattern in a portion of the scanned image corresponding to photograph 101, which is not copy restrictive. The software algorithm searches the selected portion of the scanned image for the microdot pattern at block 120 and reports that the photographs scanned are not copy restrictive, although photograph 103 was copy restrictive.

Another problem with the current software copyright detection algorithms is that it contains only basic logic which distinguishes photographic data from platen data. More specifically, if the user scans a 5×7 inch area but the photograph was only 3×5 inches, the resultant image contains image data from the platen of the scanner. In addition, in cases where the user rotates the image, the scan of that image will undoubtedly contain platen data. The platen is typically white with a high code value, i.e., on a scale of 0–255, with black equal zero and white equal to 255, the value scanned area may be 240 or greater if it contains a significant portion of the platen. To distinguish platen information from photograph data, the current software algorithms compare the pixel values of the input scan area with a pre-calculated value such as 240. Since, the code values of the platen vary, there is a chance that the algorithm may mistake platen information for photograph information. Consequently, since platen information does not contain the copy protection pattern, it could cause the algorithm to report false results, e.g. the photograph was copy restrictive but the algorithm reports that it is not copy restrictive.

Prior art systems that incorporate software that allows the user to select one of several prints on a scanner platen for reprinting, make the system susceptible to allowing printing of copy restrictive photographs. For example, in one system, the user is allowed to select as input, a collage of photographs. The system performs a full platen scan. If some prints are copy restricted and some are not, the software algorithm may report that the area is not protected because it chose to look for the protection pattern in a part of the image that was not protected. Consequently, the user could successfully reprint a copy restrictive photograph. Alternatively, if the software algorithm had determined that the collage was copy restrictive, the user would have to try to determine which photograph was copy restricted, remove that photograph from the platen, and start the process over. This would be time consuming and decrease repeat business.

There are other ways to reproduce copy restrictive documents with prior art systems. If the user were knowledgeable about the operation of the system, she could rearrange the photographs on the platen. By doing so, the user may find the right arrangement of the photographs which would allow her to succeed in copying a copy restricted photograph.

SUMMARY OF THE INVENTION

It is an object of the present invention to provide a method for scanning multiple photographs and determining whether any of the photographs are copy protected.

It is also an object of the present invention to provide a method for scanning photographs and determining whether a photograph is copy protected, when the photograph is skewed on a scanner platen.

Another object of the present invention to provide a method for scanning multiple photographs, determining whether any of the photographs are copy protected, and limiting the ability of a user to override the system.

According to one aspect of the present invention at least one photograph is placed on a scanner platen and a low resolution scan is performed to produce a low resolution image. A skew angle and a location of the photograph is determined. The photograph is rescanned at a high resolution to produce a high resolution image and the high resolution image is checked for the presence of one or more microdots. Use of the high resolution image is inhibited if microdots are detected. In one embodiment, a plurality of photographs are placed on the scanner platen and a portion of each of the high resolution images is checked by a software program for the presence of microdots.

BRIEF DESCRIPTION OF THE DRAWINGS

To facilitate understanding, identical reference numerals have been used in the drawings, where possible, to designate like elements.

DETAILED DESCRIPTION OF THE INVENTION

Figure 2:
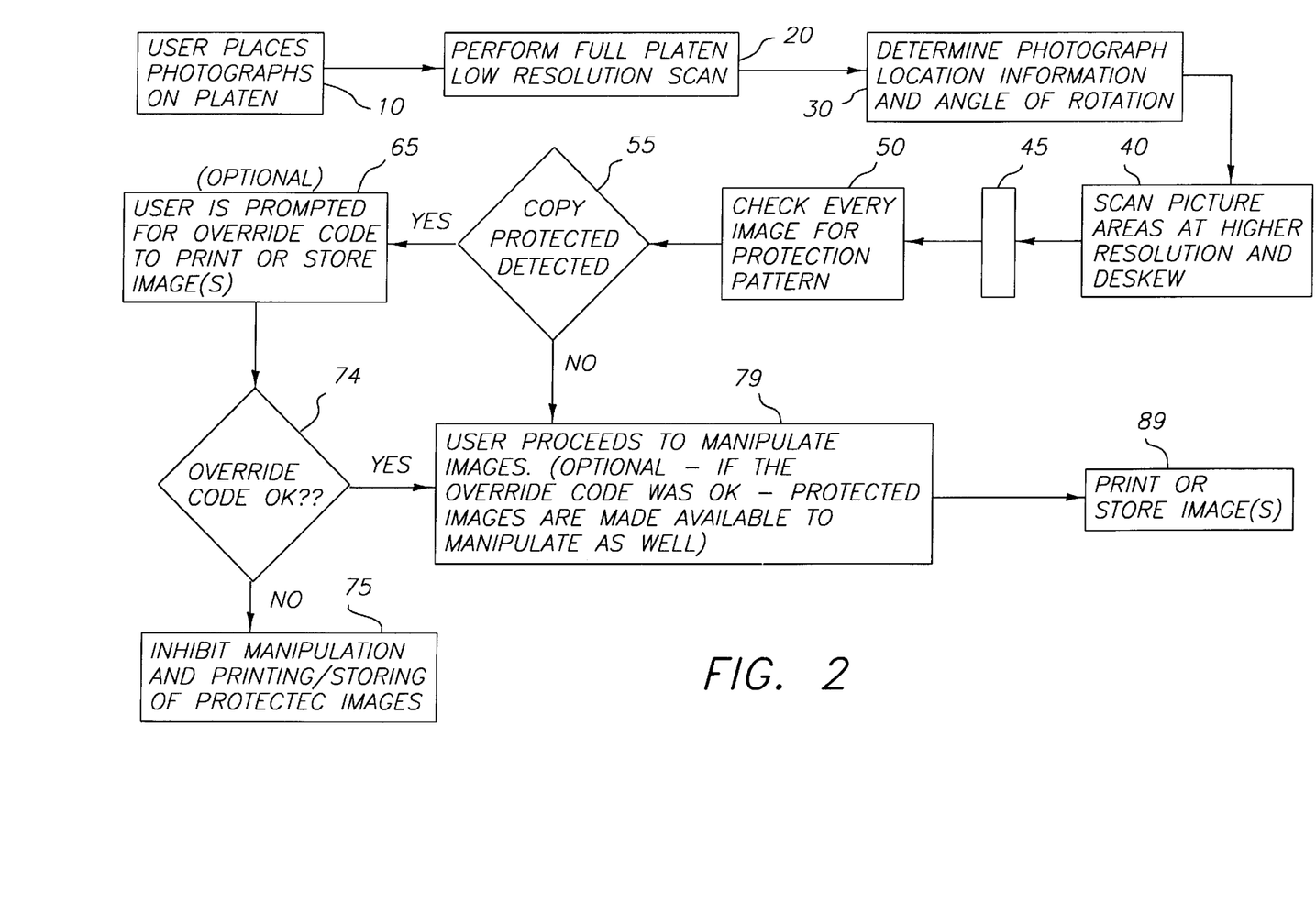
FIG. 2 is a flow path of a system according to the present invention for detecting copy restricted documents.

FIG. 2 shows a flow diagram of a method for detecting copy restrictive documents according to the present invention. The user places at least one photograph on a scanner platen at block 10. To illustrate the invention, three photographs are placed on the scanner platen as shown in FIG. 1. The system performs a low resolution scan, e.g. at 90 dpi (dots per inch), at block 20. The system determines each photograph location and angle information at block 30.

Figure 3:
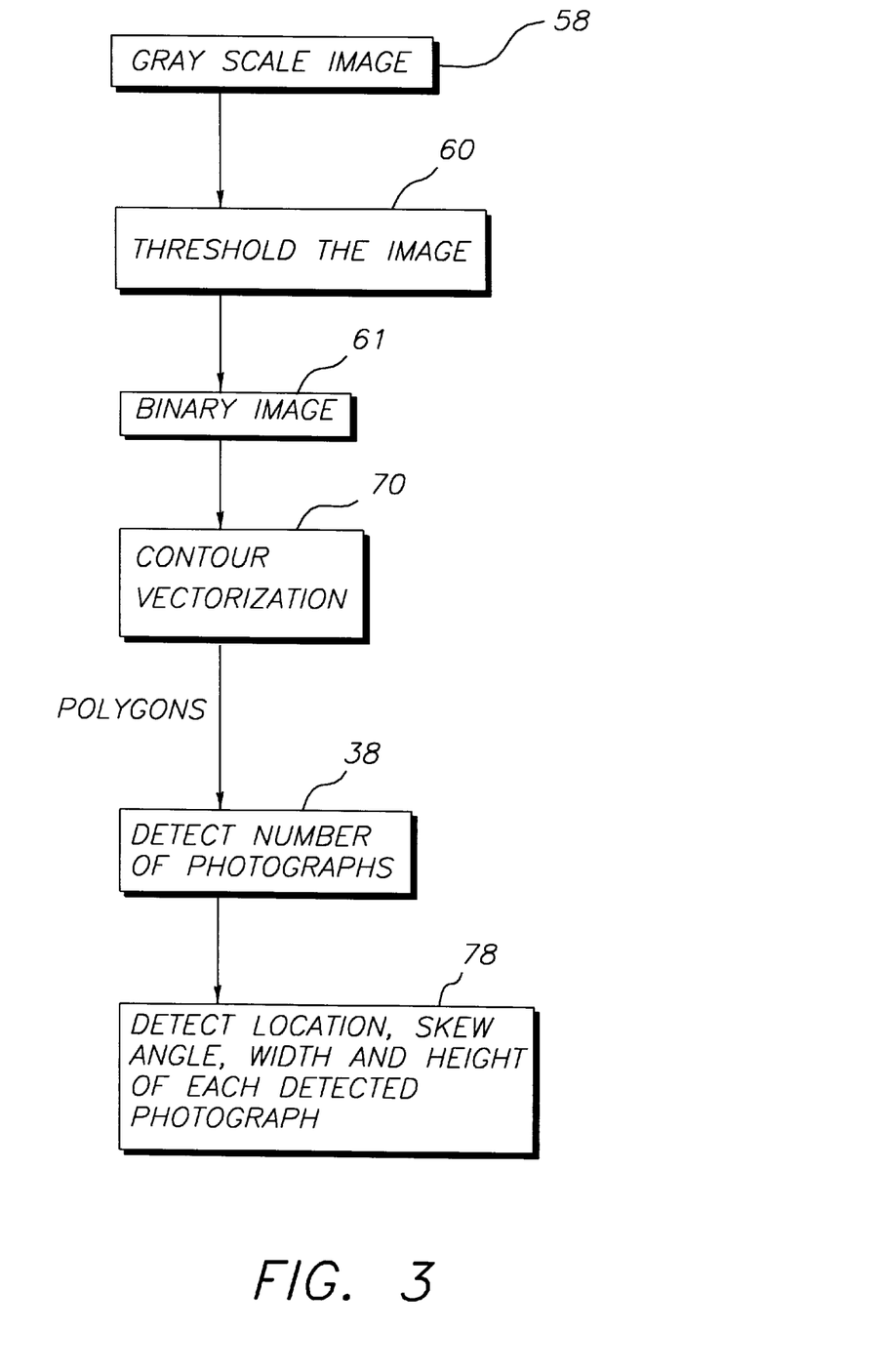
FIG. 3 is a block diagram of a system for detecting photographs.

Detection and location of photographs on the scanner platen may be done in a number of ways. One process is shown in more detail in FIG. 3. A low resolution gray scale image 58 produced by the low resolution scan is subjected to a threshold operation 60, which results in a binary image 61. A contour vectorization process 70 is then conducted which detects the number of photographs 38. The location, skew angle, width, and height of each photograph is detected at 78.

Figure 4:
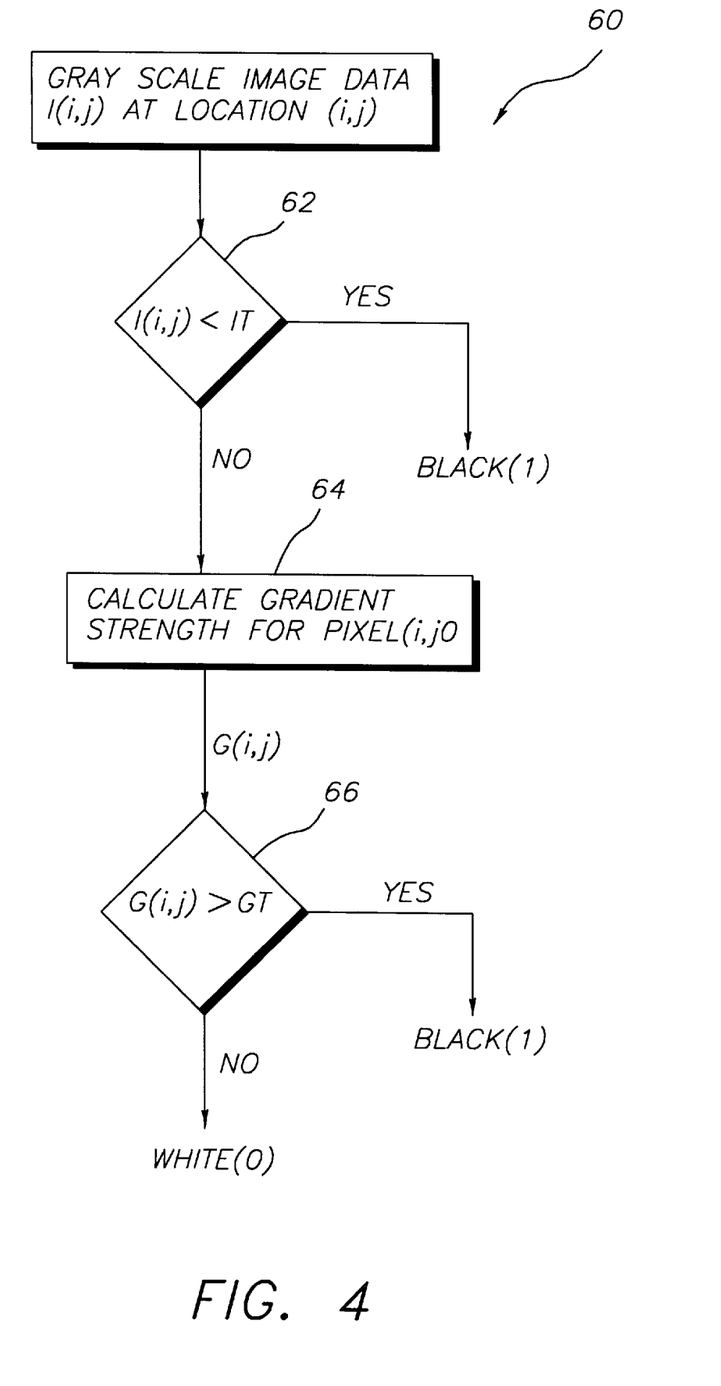
FIG. 4 is a block diagram of a system for thresholding an image.

The conversion from gray scale to binary image, called a thresholding process, is depicted in FIG. 4. In block 62, each pixel intensity is determined to be some value between 0–255. The intensity is then compared to a set value IT, for example, 230. If the intensity is less than IT the pixel is interpreted as black.

Figure 5:
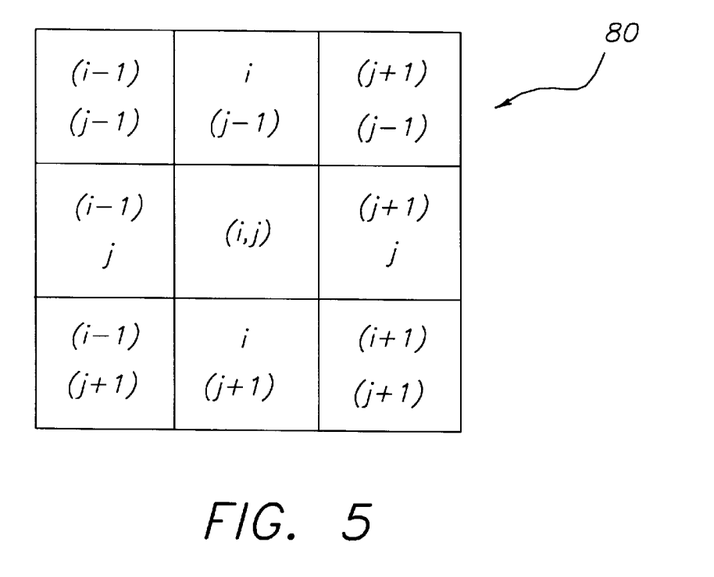
FIG. 5 is a table for calculating gradient strength.

If the intensity is greater than IT, a gradient strength for the pixel is calculated at block 64. Gradient strength for pixel (i,j) is determined by use of the so-called "Sobel" gradient operator on a window of pixels centered about pixel (i,j). See FIG. 5. Matrix 80 is a 3×3 window centered about pixel (i,j). As collectively defined in equations (1)–(3) below, the Sobel operator relies on computing horizontal and vertical pixel intensity gradients, GX (i,j) and GY (i,j), respectively, and for each pixel position (i,j) forming the gradient strength, G (i,j) as an absolute sum of GX (i,j) and GY (i,j):

$$GX(i,j)=L(i+1,j-1)+2L(i+1,j)+L(i+1,j+1)-L(i-1,j-1)-2L(i-1,j)-L(i-1,j+1) \quad (1)$$

$$GY(i,j)=L(i-1,j+1)+2L(i,j+1)+L(i+1,j+1)-L(i-1,j-1)-2L(i,j-1)-L(i+1,j-1) \quad (2)$$

$$G(i,j)=|GX(i,j)|+|GY(i,j)| \quad (3)$$

where: G (i,j) is the gradient strength at pixel position (i,j). Referring again to FIG. 4, the value G (i,j) is compared to a constant GT, for example, 50 at block 66. If the value of GT is greater than GT, the pixel is interpreted as black. This process is completed for each pixel.

Figure 6:
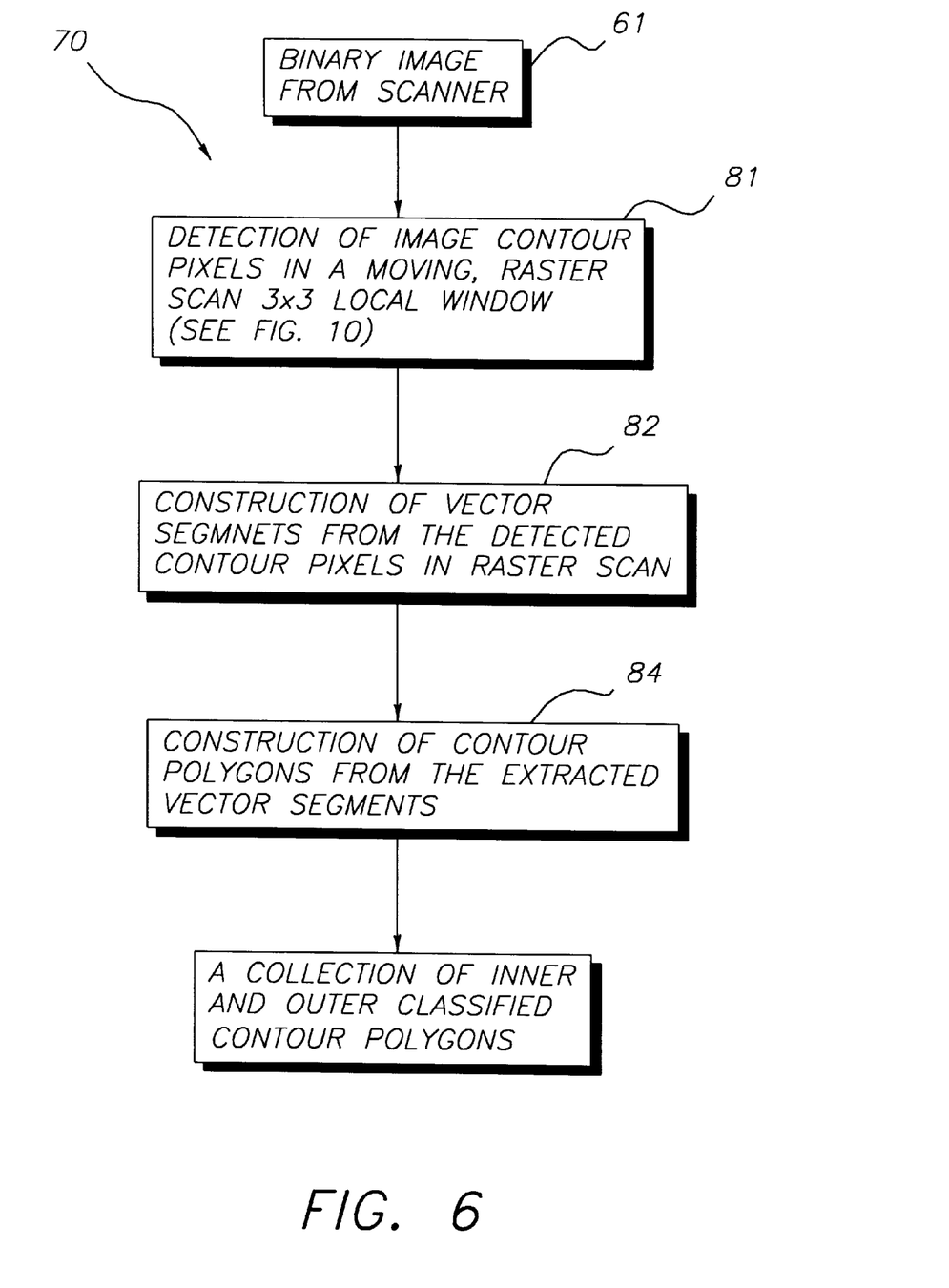
FIG. 6 is a flow diagram of contour polygon extraction.

The contour vectorization process 70 is described in more detail, with reference to FIG. 6. The binary image 61 is processed to detect contour pixels, and to assign pixel values according to established conversion values. The assignment function, represented by the block labeled 81, is implemented using a 3×3 pixel window that is advanced over the binary image one pixel column at a time. The pixels that represent the contours of the image are converted to vectors, represented by block 82. The vector segments are forwarded as the input to block 84. Block 84 represents the function of properly connecting vectors, end-to-end, to form one or more polygons representing the contours of the scanned image. In summary, the aforementioned operation, contour vectorization, converts a binary image into a collection of simple polygons which are useful in a photographic recognition system or technique such as skew detection, line detection, or image registration techniques. This process is discussed in more detail in copending U.S. application Ser. No. 08/831,272, filed Mar. 31, 1997, titled "A Method for Scanning and Detecting Multiple Photographs and Removing Edge Artifacts," by Yongchun Lee et al, which is incorporated by reference.

The system scans an area on the scanner platen which corresponded to a location information of the photographs found during step 30. The area is scanned at higher resolutions, e.g. 200 dpi or higher, as illustrated at block 40.

Figure 8:
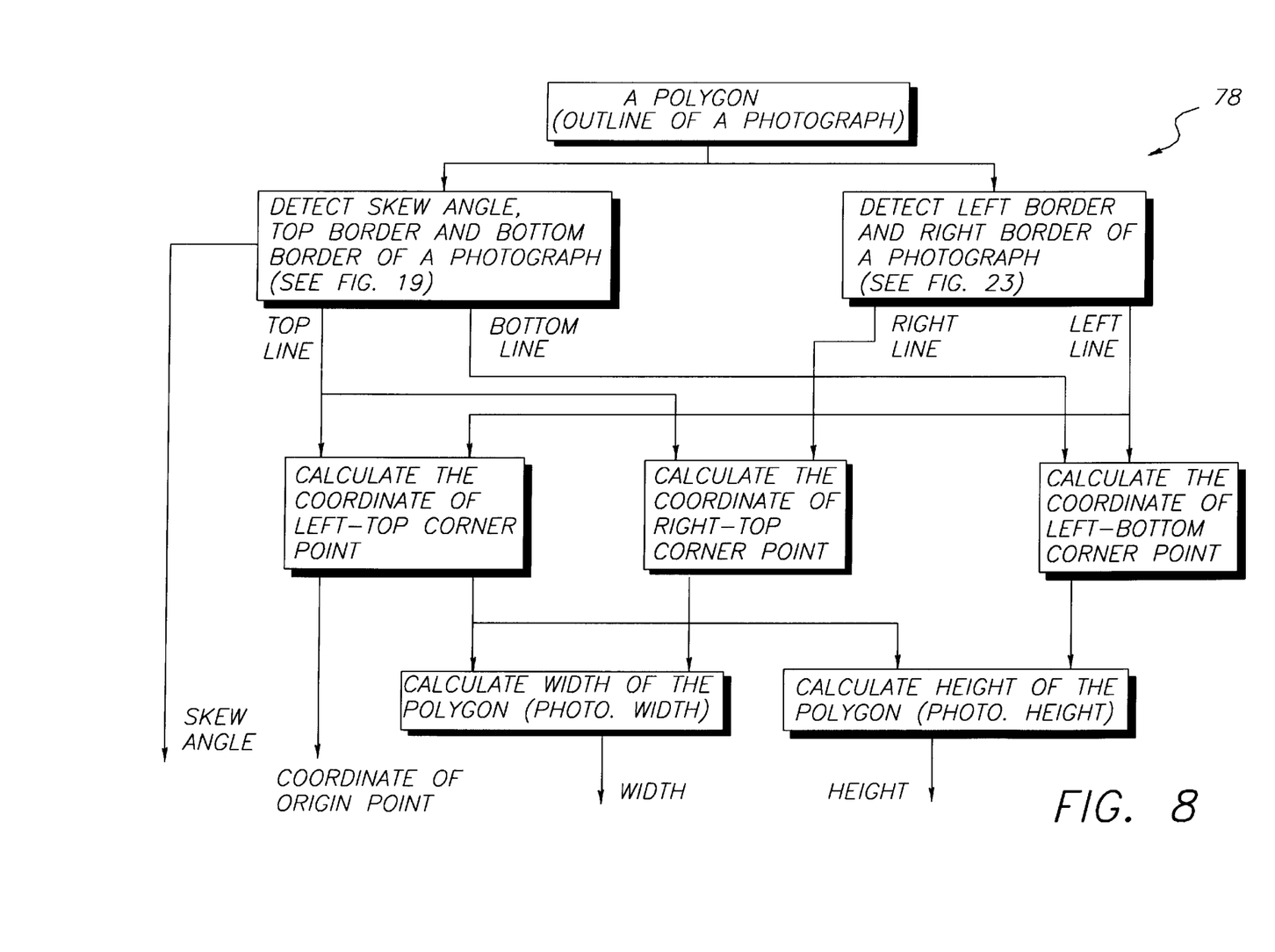
FIG. 8 is a diagram for calculating a location size and skew angle of a photograph.
Figure 9:
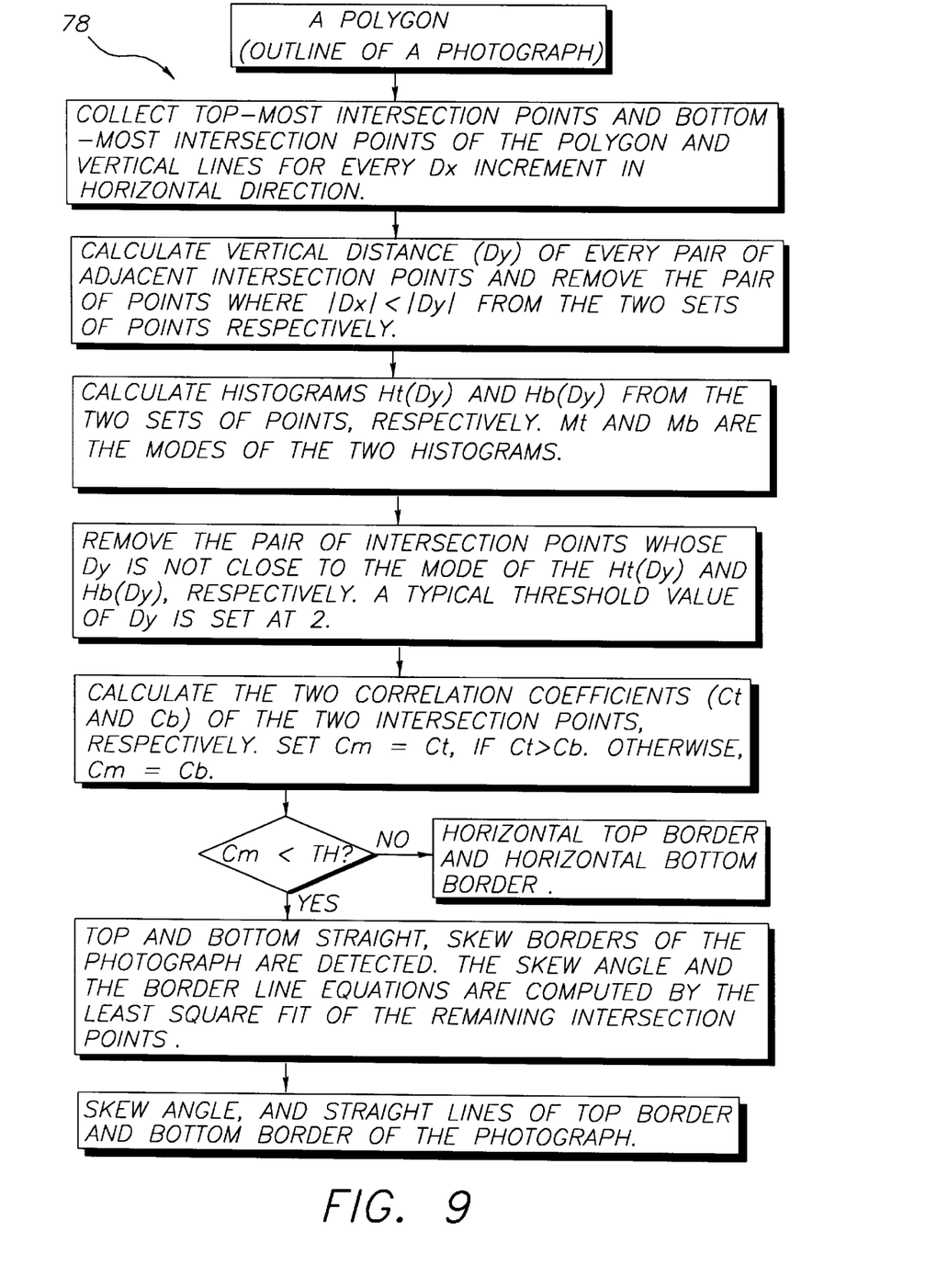
FIG. 9 is a diagram for detection of skew angle, top border, and bottom border of a photograph.
Figure 13:
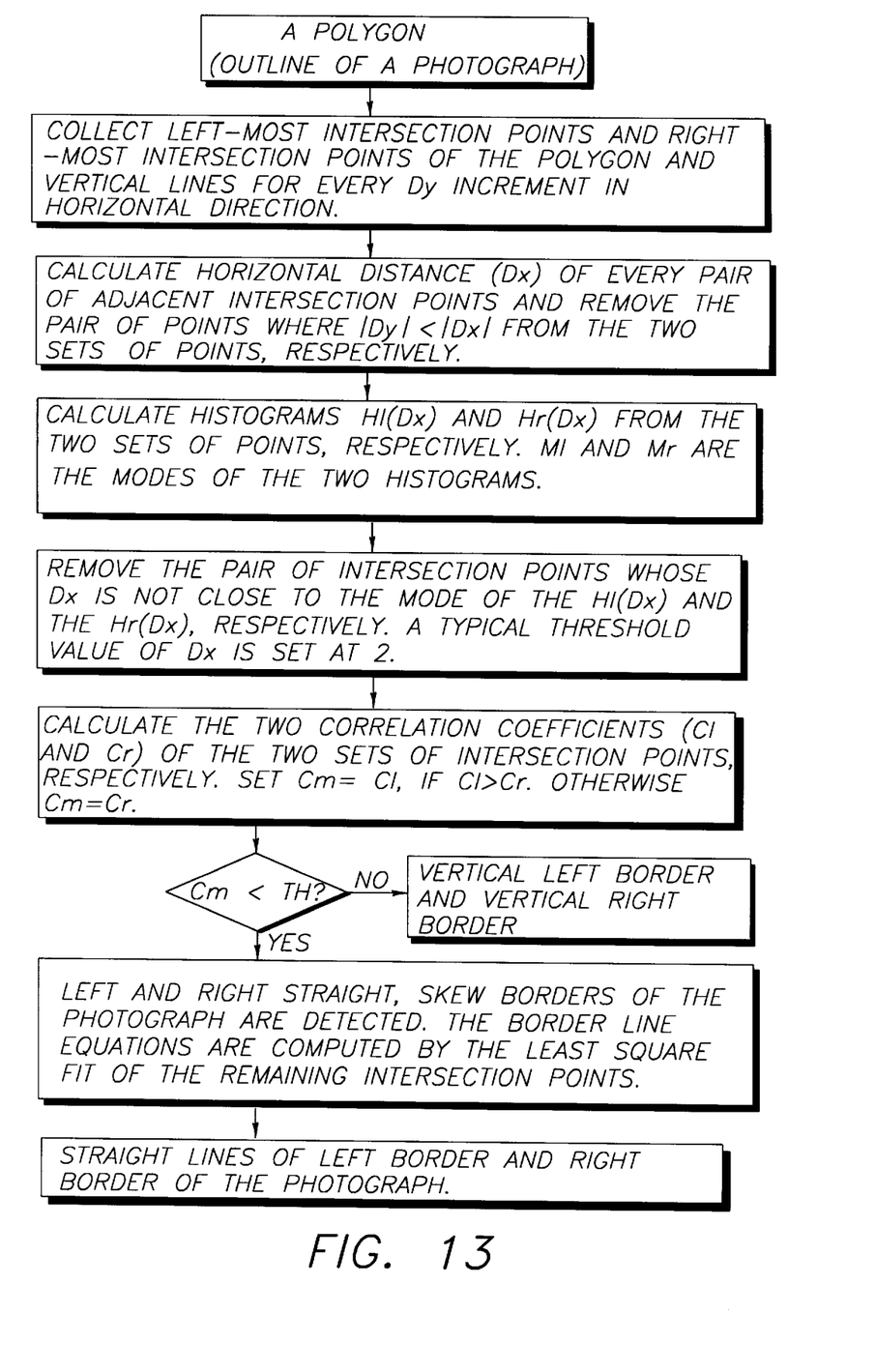
FIG. 13 is a flow diagram schematically depicting detection of left border and right border of a photograph.

The system deskews the high resolution image at block 45 in FIG. 2. FIG. 8 shows a block diagram for calculating photographic dimension and skew angle of each polygon. In the block diagram, a rectangular photograph is assumed. The block diagram starts with a polygon. By processing the polygon 90, shown in more detail in FIG. 10, a top border line 92 and a bottom border line 93 are detected, and the slope of top border line is taken as the skew angle of the photograph. The left border line 94 and the right border line 95 of the polygon are also detected. The extracted four straight border lines are used to construct a rectangular shape equivalent to the photograph selected. The left-top corner point 96 which is defined as the origin of the photograph is calculated by locating an intersection of the top border line 92 and the left border line 94. The right-top comer point 97 is calculated by locating an intersection of the top border line 92 and the right border line 95. The left-bottom comer point 98 is then calculated by locating an intersection of the left border line 94 and the bottom border line 93. A width of the photograph is the distance between the left-top comer point 96 and the right-top comer point 97, and a height of the photograph is the distance between the left-top comer point 96 and the left-bottom comer point 98. The calculation of the top border line and the bottom border line is described in FIG. 9, and the calculation of the left border and the right border lines is described in FIG. 13.

Figure 10:
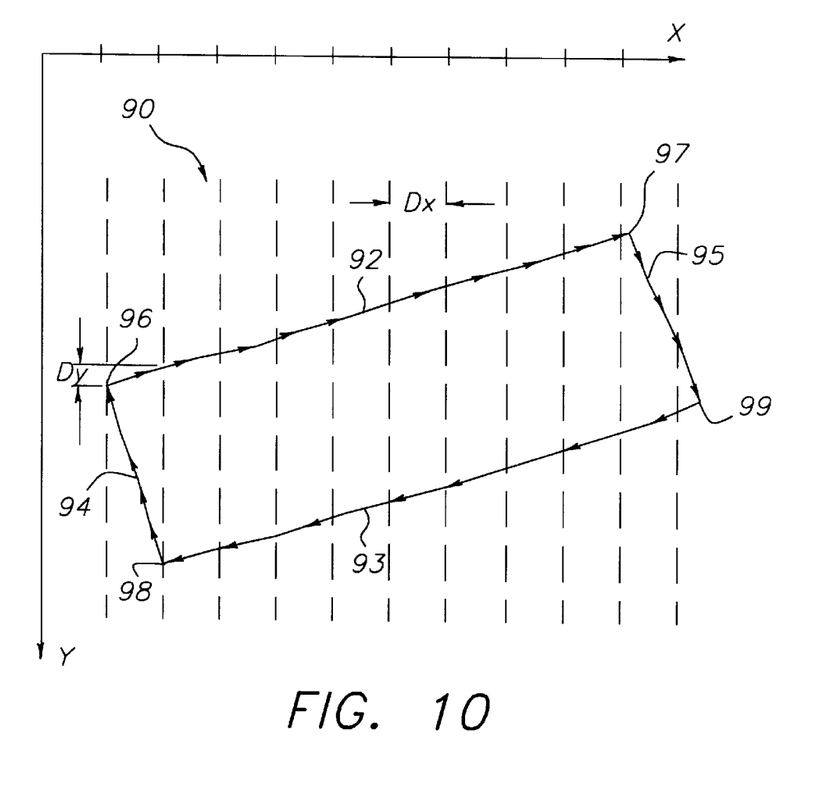
FIG. 10 is a diagram showing collection of top most intersection points and bottom most intersection points.

FIG. 10 shows an example of a photographic polygon skewed at an unknown skew angle. A series of equally spaced vertical lines are constructed, separated by a distance Dx. The points at which vertical lines intersect polygon 90 are determined. The points with the minimum and maximum values of Y are recorded. The pair of adjacent points that meet the requirement that their length (Dy) in the vertical direction is greater than their length (Dx) in the horizontal direction are deleted from the two sets of points, respectively.

Figure 11:
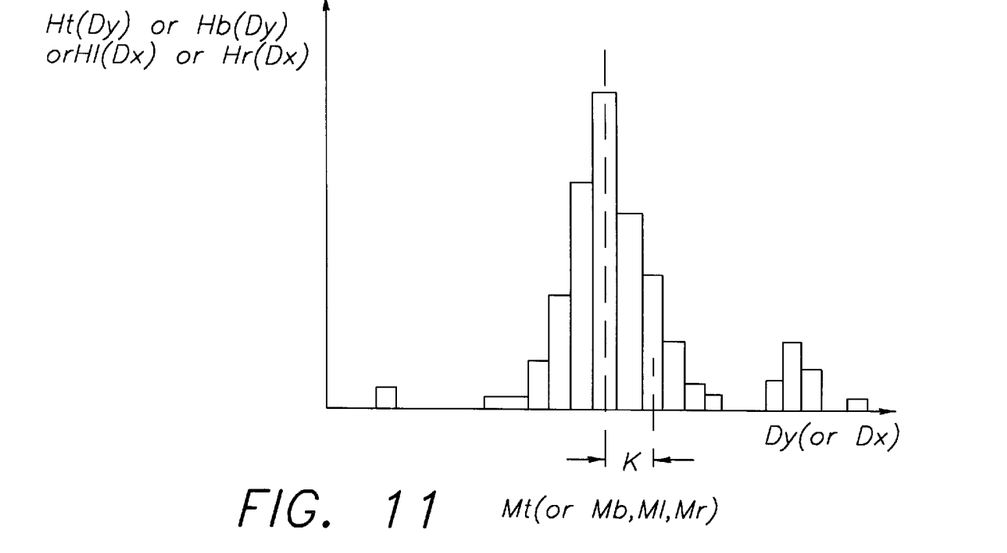
FIG. 11 is a histogram of vertical distance of adjacent intersection points.

Next, two histograms of the vertical distances of adjacent points, histogram (Ht (Dy)) of top intersection points and histogram (Hb (Dy)) of bottom intersection points, are calculated. The modes of the two histograms are labeled as Mt and Mb as shown in FIG. 11, respectively. To further refine the slope determination, points falling outside of the range of Mt+/−K values and Mb+/−K values are removed, respectively. After the data refining process, the correlation coefficients Ct and Cb of the remaining top intersection points and the remaining bottom intersection points are calculated for evaluating the collinearity of the points, respectively. The correlation coefficients are determined as follows. The points of intersection between these scan lines and the top or bottom line of the polygon are $(x_i, y_i)$ where $i=1, \ldots, N$, and N is the number of intersection points. The correlation coefficient $(r_{xy})$ is defined by $$r_{xy} = \frac{S_{xy}}{S_x S_y}, \text{ where } S_{xy} = \sum_{i=0}^{N} (x_i - \bar{x})(y_i - \bar{y}) \text{ and}$$

-continued $$S_x = \sqrt{\sum_{i=1}^{N} (x_i - \bar{x})^2}, S_y = \sqrt{\sum_{i=1}^{N} (y_i - \bar{y})^2}$$

The value of the correlation coefficient is between zero and one, according to the definition. If the correlation coefficient is close to one, it indicates that these points are collinear, and the linear least square fit is applied to these points. The rotating angle $\theta_S$ is read from the slope $\theta_S = \arctan(b)$ of the fitted straight line, y=a+bx, where $$b = \frac{\sum_{i=1}^{N} x_i y_i - N\bar{x}\bar{y}}{\sum_{i=1}^{N} x_i^2 - N\bar{x}^2}, \bar{x} = \sum_{i=1}^{N} x_i, \bar{y} = \sum_{i=1}^{N} y_i.$$

The rotating angle of the polygon is taken as the skew angle of the scanned photographs.

Figure 12:
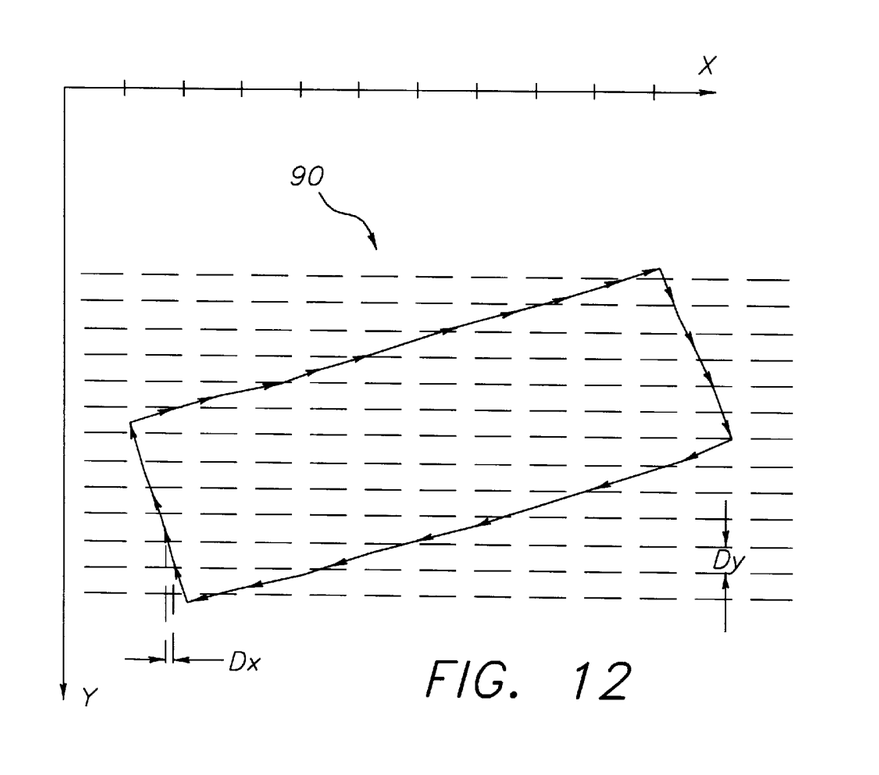
FIG. 12 is a diagram showing collection of left most intersection points and right most intersection points.

Since the shape of the photograph is assumed to be rectangular, the top border line and the bottom border line must be parallel. Hence, the evaluation of the collinearity of the points uses the greater value (Cm) of the two correlation coefficients, Ct and Cb, shown in FIGS. 9 and 13. In case that the Cm is smaller than a predefined threshold (TH), it indicates that either the horizontal border or irregular border is detected. Under this condition, the skew angle is always set to zero. This means that top and bottom borders are set to be horizontal. The calculation of the left border and the right border lines is similar to the steps described above. The block diagram of the process is repeated for horizontal intersections, shown in FIG. 12, and calculations of the left border line and the right border line in FIG. 13.

Figure 7:
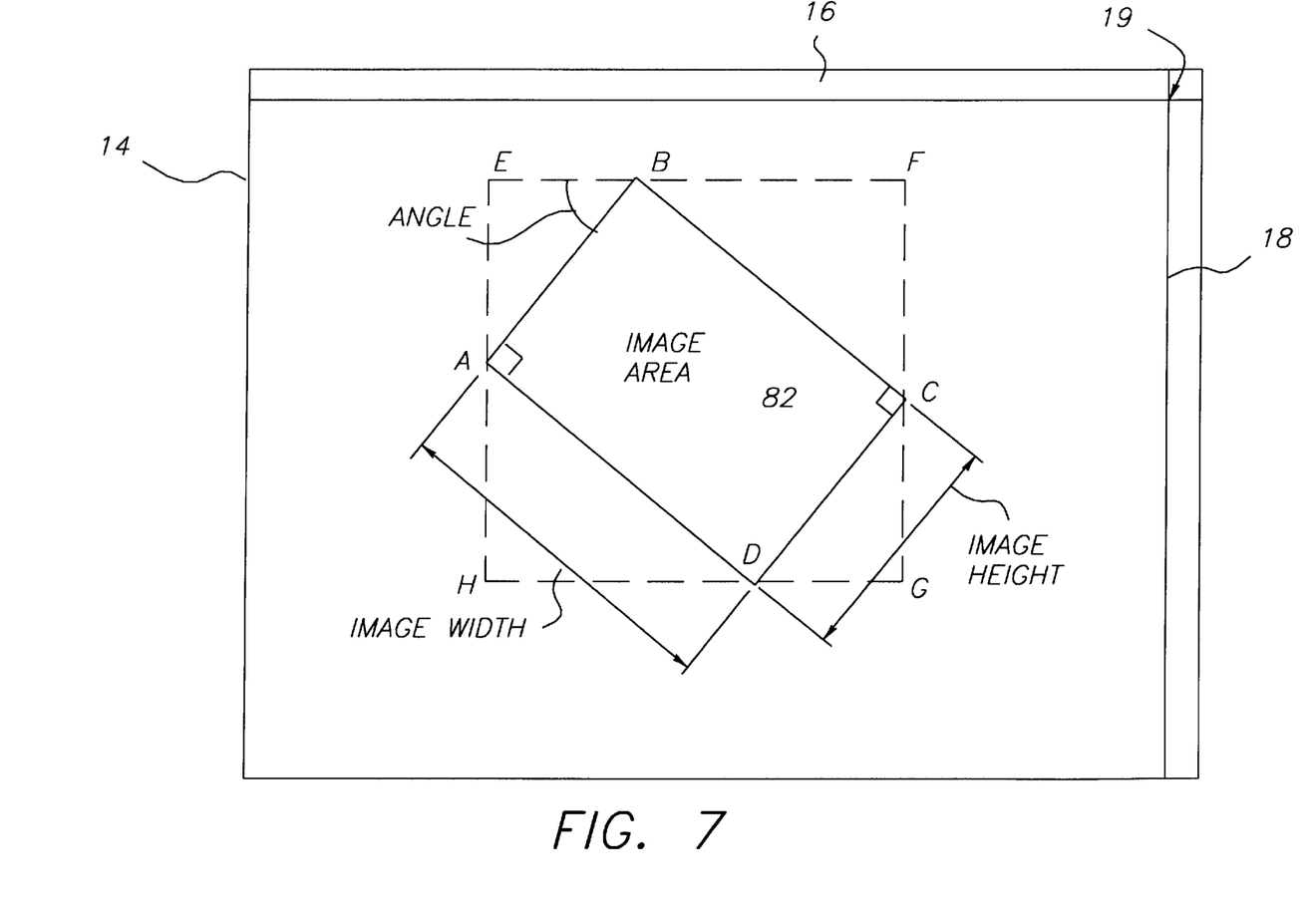
FIG. 7 is a schematic view of a skewed photograph on a scanner platen.

After the origin point of the photograph (left-top corner) is determined, image dimensions (width and height) and skew angle of every detected photograph is calculated from the full platen low resolution scan. The image bounding coordinates as shown in FIG. 7 are readjusted (scaled up) and mapped into the coordinate of a desired high resolution scan.

A photograph of interest is selected and a high resolution scan of the selected photograph is made. After the high resolution scan the high resolution image is deskewed, shown in block 45 of FIG. 2, with a standard bilinear image interpolation as is well know in the art.

Figure 14:
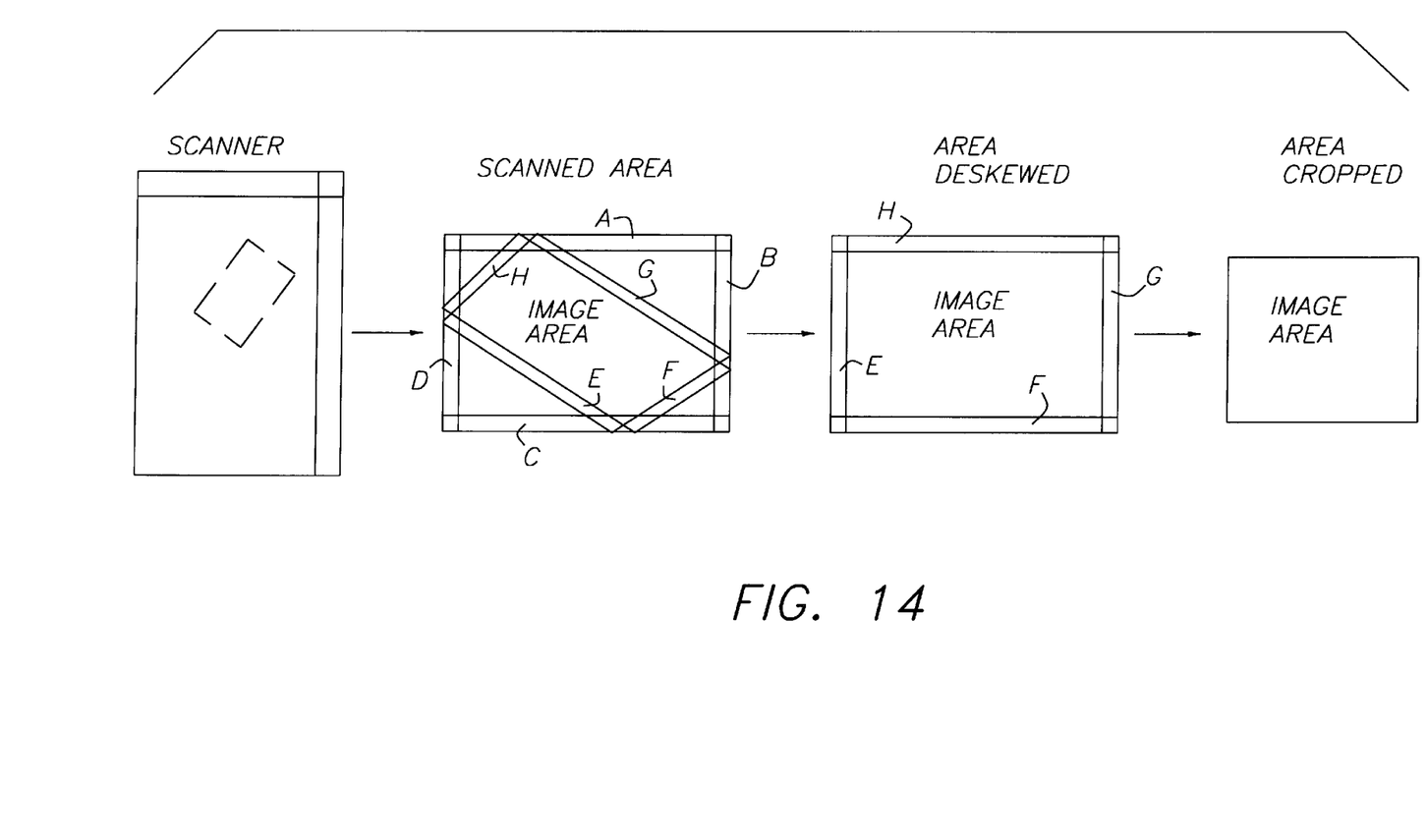
FIG. 14 is a flow diagram schematically depicting the deskew and cropping operation.

FIG. 14 shows schematically the deskewing and removal of artifacts by cropping the image area. After the image has been deskewed, top, bottom, and side edge artifacts can be easily removed. The image can then be stored to a disk as is well known in the art or printed as a photograph.

The system runs the copy-protection algorithm on each individual photograph scanned at block 50. If the software finds the protection pattern in at least one of the images, block 55, the user is prompted for an override code to allow manipulation, printing, storing, or transmission of copy restrictive images at block 65. If an override code is entered at block 65, the override code is checked at block 74. If the override code is invalid, the user is inhibited from performing any further actions on the protected photograph images at block 75. Unprotected photographic images, however, may still be manipulated, printed, stored, or transmitted. This process is discussed in more detail in copending U.S. application Ser. No. 08/593,772, filed Jan. 29, 1996, titled "Copy Protection System," by Jay S. Shildkraut, et al, which is incorporated by reference.

If a valid override code was detected at block 70, or if no copy-protection was detected at 55, the high resolution image is available for manipulation at block 79. After user manipulation, the user makes a legal print or stores the high resolution image at block 89.

The copy-protection scheme according to the present invention is intended to be incorporated into applications which involve scanning images and transferring them to some form of media, i.e. digital images that are stored, or hard copy prints such as thermal prints. By incorporating image detection into an overall scan-print scheme, the application is able to determine which prints are protected and which were not in cases where the user placed more than one image on the scanner, or in cases where the photograph is skewed. Afterwards, the application prompts the user for proper copy release information to print or store those images that were protected. If the user did not have such release information which are obtained from the photographer, the application could just print those images in the scan that were not protected instead of starting from the beginning and removing images from the scanner that were protected.

The advantage of determining the location of the print and its orientation is that copy-protection pattern can be looked for only in the area of the digital image that is occupied by the photograph. This increases the overall reliability of the software.

Figure 15:
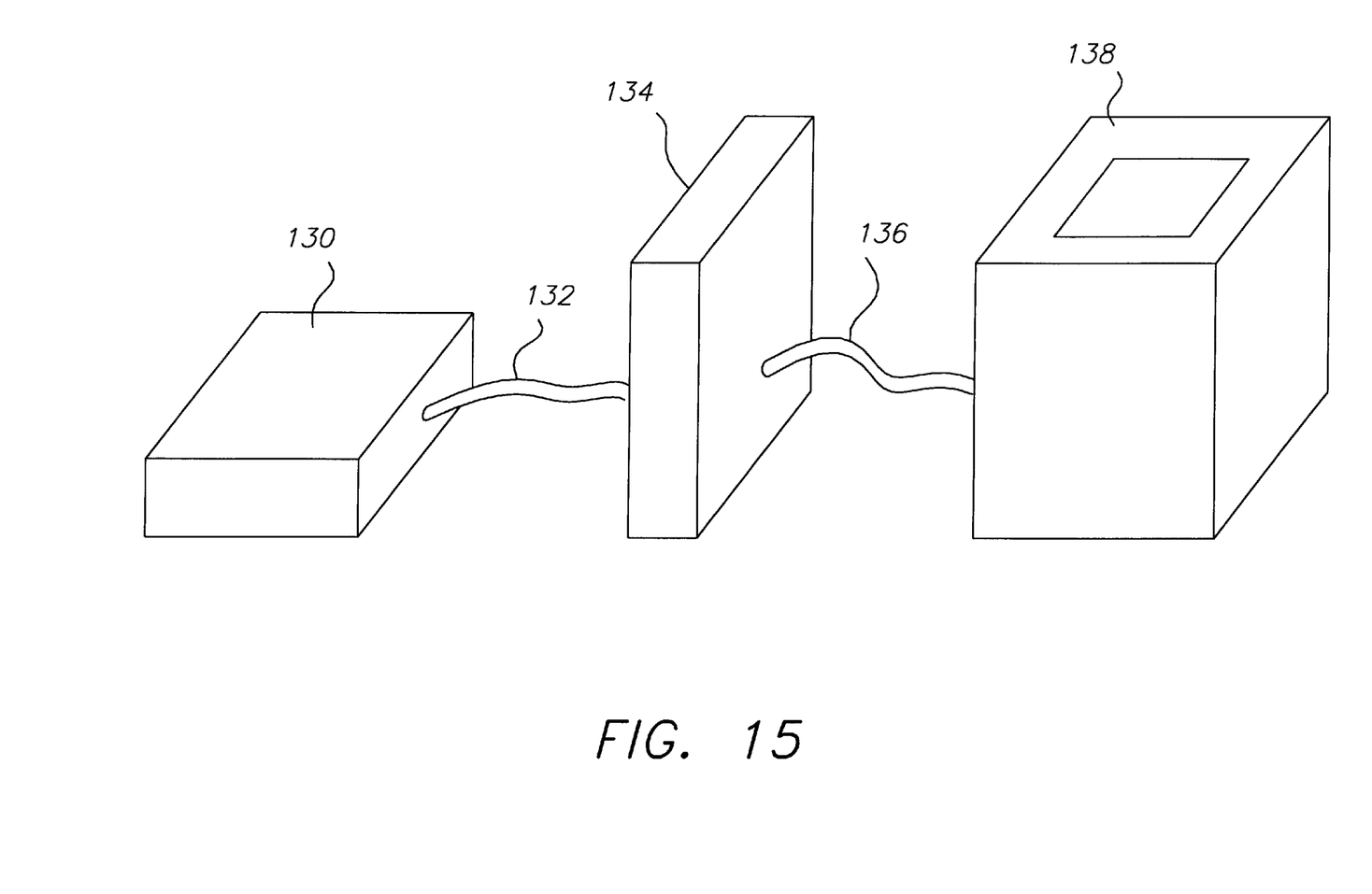
FIG. 15 is a perspective view of an apparatus for carrying out the present invention.

FIG. 15 shows an apparatus for carrying out the present invention. Photographs or documents are placed on a scanner 130. A flat bed scanner is used in the preferred embodiment. The scanned images are transmitted by cable 132 to a computer 134. Although a stand-alone computer is shown in this embodiment, dedicated microprocessors may be used for processing the image, and may be incorporated into a single unit containing both scanner 130 and computer 134. Computer 134 determines a location of photographs on scanner 130, and detects the presence of one or more microdots in the scanned image. The detection of the microdots is accomplished by a software program, which determines the presence of a Fourier transform based on the presence of the microdots. If no microdots are present in the photograph, the photograph may be transmitted by cable 136 to a printer 138. The images may also be stored on computer 134 for further use or manipulation, or transmitted to other equipment, or the Internet, as is well known in the art.

The invention has been described in detail with particular reference to certain preferred embodiments thereof, but it will be understood that variations and modifications can be effected within the spirit and scope of the invention. For example, while the invention has been discussed in terms of photographs, documents may also incorporate a microdot pattern to prevent unauthorized copying. In these cases, the invention may be used to detect copy restrictive documents and prevent their unauthorized use. Also, while the preferred embodiment of the invention incorporates a deskewing step, it is not essential. Once the location has been determined and the outline of the photograph or document has been fixed, that specific area can be searched for the microdot pattern to prevent unauthorized copying.

PARTS LIST 10 scanner platen
20 low resolution scan
30 location and angle information
38 number of photographs
40 high resolution scanning
45 deskewing
50 copy-protection algorithm
55 images
58 low resolution gray scale image
60 threshold operation
61 binary image
62 pixel intensity
64 pixel gradient strength
65 copy restrictive images
66 comparison block
70 contour vectorization process
74 override code
75 protected photograph images
78 photograph detection
79 manipulation block
80 matrix
81 assignment function
82 vectors
84 connecting vectors
89 making legal print or storing
90 polygon
92 top border line
93 bottom border line
94 left border line
95 right border line
96 left-top corner point
97 right-top corner point
98 left-bottom corner point
100 photographs on scanner
101,102 unprotected image
103 protected image
110 microdot pattern search
120 microdot pattern search and report
130 scanner
132 cable
134 computer
136 cable
138 printer

What is claimed is:

1. A method for detecting copy restrictive documents comprising the steps of:

simultaneously placing a plurality of photographs on a scanner platen;

performing a low resolution scan to produce a plurality of low resolution images representative of said photographs;

determining a skew angle and a location on said scanner platen of each of said photographs from said low resolution images;

scanning each of said photographs at a high resolution to produce a plurality of high resolution images representative of said photographs;

deskewing each of said high resolution images;

detecting a presence of one or more microdots in each of said high resolution images; and inhibiting use of any of said high resolution images in which microdots have been detected.

2. A method for detecting copy restrictive documents as in claim 1 comprising the further step of checking a portion of each of said high resolution images for the presence of one or more of said microdots.

3. A method for detecting copy restrictive documents comprising the steps of:

simultaneously placing a plurality of photographs on a scanner platen;

performing a scan of said plurality of photographs to produce a plurality of images representative of said plurality of photographs;

determining a location on said scanner platen of each of said plurality of photographs;

detecting a presence of one or more microdots in each of said plurality of photographs; and inhibiting use of any of said photographs in which said microdots are detected.

* * * * *